United States Patent
Smathers et al.

(10) Patent No.: US 11,137,824 B2
(45) Date of Patent: Oct. 5, 2021

(54) PHYSICAL INPUT DEVICE IN VIRTUAL REALITY

(71) Applicant: Hewlett-Packard Development Company, L.P., Spring, TX (US)

(72) Inventors: Kevin Smathers, Palo Alto, CA (US); Hiroshi Horii, Palo Alto, CA (US); Ian N. Robinson, Palo Alto, CA (US); Robert Paul Martin, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,863

(22) PCT Filed: Jul. 21, 2017

(86) PCT No.: PCT/US2017/043391
§ 371 (c)(1),
(2) Date: Dec. 3, 2019

(87) PCT Pub. No.: WO2019/017976
PCT Pub. Date: Jan. 24, 2019

(65) Prior Publication Data
US 2020/0387215 A1 Dec. 10, 2020

(51) Int. Cl.
*G06F 3/01* (2006.01)
*G02B 27/01* (2006.01)
*G06T 19/00* (2011.01)

(52) U.S. Cl.
CPC .......... *G06F 3/011* (2013.01); *G02B 27/0172* (2013.01); *G06T 19/006* (2013.01); *G02B 2027/014* (2013.01); *G02B 2027/0138* (2013.01)

(58) Field of Classification Search
CPC ........ G06T 19/006; G06F 3/011; G06F 3/147; G09G 5/14; G09G 2354/00;
(Continued)

(56) References Cited

U.S. PATENT DOCUMENTS 9,529,424 B2 12/2016 Hilliges et al.
9,599,821 B2 3/2017 Van Curen et al.
(Continued)

FOREIGN PATENT DOCUMENTS

CN 102169366 8/2011
CN 106156769 11/2016
(Continued)

OTHER PUBLICATIONS

"LightVR uses headset camera to see real keyboard" Hypergrid Business Press Release, Posted Sep. 4, 2016 [online], [retrieved on Nov. 12, 2019] Available at: <http://www.hypergridbusiness.com/2016/09/lightvr-uses-headset-camera-to-see-real-keyboard/>.
(Continued)

*Primary Examiner* — Abbas I Abdulselam
(74) *Attorney, Agent, or Firm* — HP Inc. Patent Department

(57) ABSTRACT

An example system includes a camera to capture an image of at least one physical input device, a virtual reality (VR) environment display portion to generate a VR environment, a window forming portion to create a window in the VR environment, the position of the window in the VR environment corresponding to a physical location of an interaction area that includes the at least one physical input device, an input device display portion to form an image of the at least one physical input device from the camera, and a VR headset including a head-mounted display to display a composite image of the VR environment, the window and the image of the at least one physical input device. The
(Continued)

composite image includes the image of the at least one physical input device within the window.

11 Claims, 5 Drawing Sheets

(58) Field of Classification Search
CPC ....... G09G 2320/0693; G09G 2360/08; G02B 2027/0138; G02B 2027/014; G02B 27/0172
See application file for complete search history.

(56) References Cited

U.S. PATENT DOCUMENTS

| | | |
|---|---|---|
| 2004/0113885 A1 | 6/2004 | Genc et al. |
| 2009/0040296 A1 | 2/2009 | Moscato |
| 2010/0177035 A1 | 7/2010 | Schowengerdt et al. |
| 2010/0182340 A1 | 7/2010 | Bachelder et al. |
| 2013/0027572 A1 | 1/2013 | Petrou |
| 2014/0240354 A1 | 8/2014 | Ma et al. |
| 2016/0027214 A1 | 1/2016 | Memmott et al. |
| 2016/0189426 A1 | 6/2016 | Thomas et al. |
| 2017/0124765 A1 | 5/2017 | Imamura |
| 2017/0139212 A1* | 5/2017 | Choi ................... H04N 13/344 |
| 2018/0329452 A1* | 11/2018 | Zhang .................. G06F 1/1632 |

FOREIGN PATENT DOCUMENTS

| | | |
|---|---|---|
| CN | 106575151 | 4/2017 |
| CN | 106716302 | 5/2017 |
| CN | 106886218 | 6/2017 |
| JP | 2013110514 | 6/2013 |
| WO | WO-2017053462 | 3/2017 |

OTHER PUBLICATIONS

Bottone, M et al, "Improving interaction in hmd-based vehicle simulators through real time object reconstruction." In Proceedings of the 2016 Symposium on Spatial User Interaction, pp. 111-120. ACM, 2016.

UploadVR "Envelop VR Desktop Windows Virtual Reality Software", YouTube, Posted Jul. 7, 2016 [online], [retrieved on Nov. 12, 2019].

* cited by examiner

PHYSICAL INPUT DEVICE IN VIRTUAL REALITY

BACKGROUND

Virtual reality is becoming popular in numerous applications, including business and personal entertainment. In many of these, a virtual-reality (VR) display is provided in a VR headset. The VR headset may be worn by a user with a VR display positioned above at least one eye. The user may then move about a virtual reality environment with movements of his or her head.

BRIEF DESCRIPTION OF THE DRAWINGS

For a more complete understanding of various examples, reference is now made to the following description taken in connection with the accompanying drawings in which.

DETAILED DESCRIPTION

Various examples described herein relate to virtual reality displays. In various examples, a VR headset includes a display and a processor. The processor can cause the display to present a VR environment to a user. A window is formed in the VR environment, the window corresponding to the physical location of a physical input device, such as a keyboard or a mouse, for example. The position of the window within the VR environment may be based on, for example, markers that identify a region corresponding to the physical location of the physical input device. Within this window the processor displays an image of the physical input device received from a camera. Thus, while viewing the VR environment, the user views the physical input device in the VR environment at approximately the same location as the physical location of the physical input device. Further, display latency can be significantly reduced by using a processor in the headset to composite in the image from the camera.

As noted above, in many cases, virtual-reality (VR) display is provided in a VR headset which may be worn by a user with a VR display positioned above at least one eye. The user may then move about a VR environment with movements of his or her head. In some cases, a user may interact with an input device, such as a keyboard or a mouse, as part of the virtual reality experience. For example, a user may provide input to a system while viewing the VR environment. Displaying the input device within the VR environment can allow the user to more seamlessly combine the virtual reality experience with physical device, and simplifies the task of using traditional user input devices in a virtual reality environment.

Figure 1:
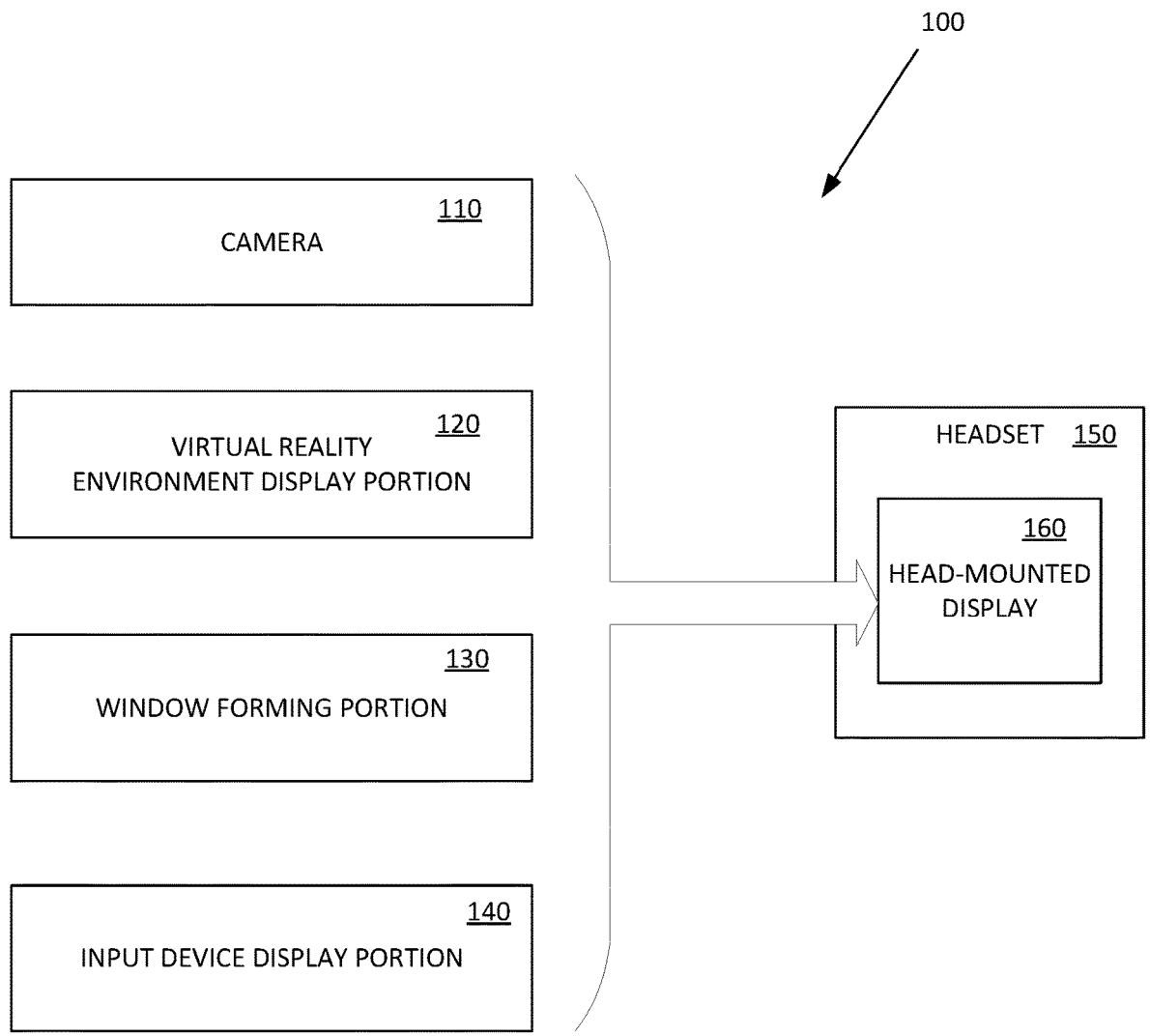
FIG. 1 illustrates an example virtual-reality (VR) system.

Referring now to FIG. 1, an example virtual reality (VR) system 100 is illustrated. The example system 100 of FIG. 1 includes a camera 110, a VR environment display portion 120, a window forming portion 130, an input device display portion 140 and a headset 150. In various examples, the camera 110 may be a digital camera to provide a video stream. As described below, in some examples, the camera 110 may be provided as part of the headset 150. In other examples, the camera 110 may be provided in a fixed physical position. In various examples, the camera is coupled to at least one of the VR environment display portion 120, the window forming portion 130, the input device display portion 140, or the headset 150, such as a VR headset. The VR environment display portion 120, the window forming portion 130 and the input device display portion 140 may composite images for display on a head mounted display 160 of the headset 150. The VR environment display portion 120, the window forming portion 130 and/or the input device display portion 140 may be implemented as hardware, software, firmware or a combination thereof. In one example, at least one of the VR environment display portion 120, the window forming portion 130 or the input device display portion 140 are implemented in a processor attached to the head-mounted display 140 in the headset 130. In another example, each of the VR environment display portion 120, the window forming portion 130 and the input device display portion 140 may be external to the headset, for example, in a PC connected to the headset 150 via a cable or wirelessly.

In various examples, the head-mounted display 160 may include a screen or a screen portion for each eye. In one example, the head-mounted display 160 includes a screen that includes a left-eye portion and a right-eye portion corresponding to each eye of the user.

In various examples, the VR environment display portion 120 is provided to generate a virtual reality environment to be displayed on the head-mounted display 160. In this regard, the VR environment display portion 120 may receive data from a user associated with a desired VR environment, for example their location and gaze direction. The data may be associated with, for example, a video game or a productivity application. In one example, the VR environment display portion 120 uses the data to generate two corresponding images, one for the left-eye portion of the head-mounted display 160 and another for the right-eye portion of the head-mounted display 160. As noted above, the VR environment display portion 120 may be provided, in some examples, in the headset 150 (e.g., in a processor of the headset 150), and in other examples, external to the headset 150 (e.g., in a processor of a PC connected to the headset 150).

In various examples, the window forming portion 130 is provided to form a window in the VR environment generated by the VR environment display portion 120. As described in greater detail below, the window formed by the window forming portion 130 may be a transparent area from which the VR environment is removed, for example, allowing the user to see objects in the physical environment. Again, the window forming portion 130 may be provided, in some examples, in the headset 150, and in other examples, external to the headset 150.

In various examples, the window formed by the window forming portion 130 corresponds to a physical location of at least one physical input device. The physical location of the at least one physical input device may be determined by any of a variety of manners, examples of which are described below. Thus, the location of the window in the VR environment corresponds to the location of the physical input device in the physical environment. The physical input device may be any of a variety of input devices, such as a keyboard, mouse, track-ball, digitizing pen tablet, touch-screen or the like.

In various examples, the example system 100 includes the input device display portion 140. The input device display portion 140 may use an image of at least one physical input device (e.g., keyboard, mouse, track-ball, digitizing pen tablet, touch-screen, etc.) from the camera 110. In accordance with various examples, the input device display portion 140 positions the at least one physical input device within the window in the VR environment formed by the window forming portion 130. The head-mounted display 160 may display a composited image including the VR environment provided by the VR environment display portion 120, the window formed by the window forming portion 130 and any input devices provided by the input device display portion 140. Again, the input device display portion 140 may be provided, in some examples, in the headset 150, and in other examples, external to the headset 150. In one example, the input device display portion 140 is provided in the headset 150 to significantly reduce latency.

Figure 2:
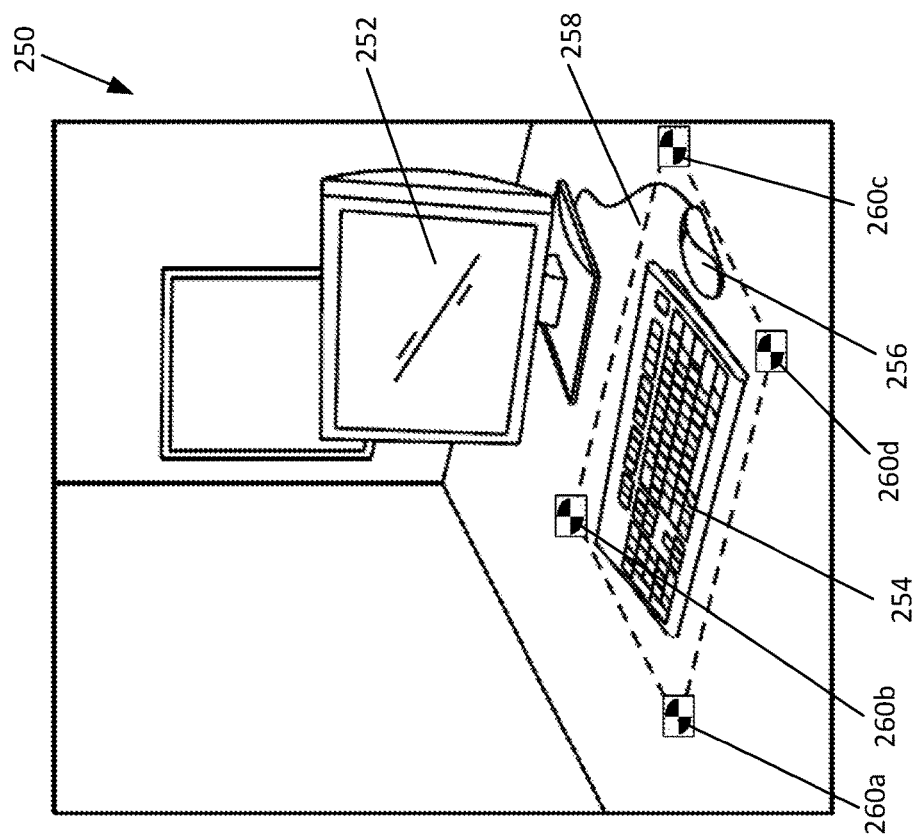
FIG. 2 illustrates an example VR environment with a window and a corresponding example physical input device.
Figure 2:
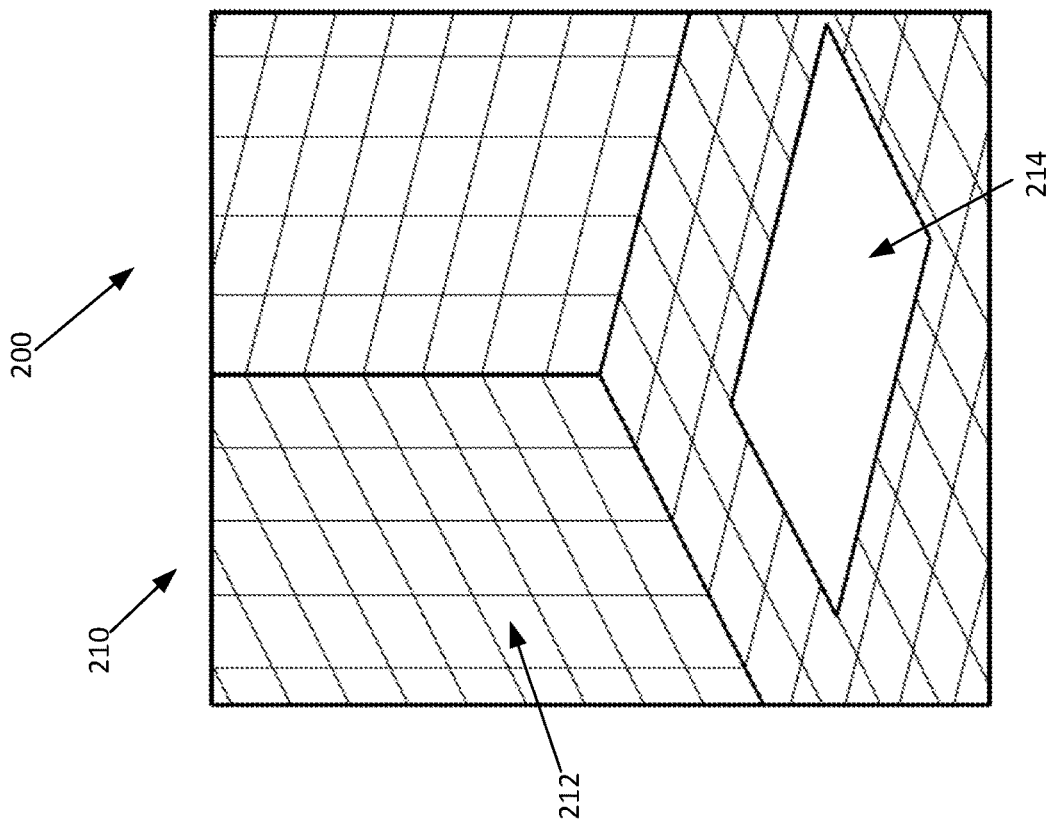

Referring now to FIG. 2, an example arrangement 200 is illustrated with an example VR environment 210 and a corresponding physical environment 250. In the example arrangement 200, the example VR environment 210 is illustrated as a room 212. Various objects (e.g., animated characters, furniture, etc.) may be included in the illustrated VR environment 210. The VR environment 210 may be specified by a data file, such as a video game, for example. The example VR environment 210 may be generated by, for example, the VR environment display portion 120 of the example system 100 of FIG. 1. The example VR environment 210 of FIG. 2 includes a window 214 formed therein. As noted above with reference to the example of FIG. 1, the window 214 may be formed by the window forming portion 130 of the example system 100 of FIG. 1.

In the example arrangement 200 of FIG. 2, the example physical environment 250 includes various components that may be available on a desk top, for example. In the example of FIG. 2, the example physical environment 250 includes a monitor 252, a keyboard 254 and a mouse 256. As noted above, a camera (e.g., camera 110 of FIG. 1) may capture an image of at least one physical input device.

In various examples, the window 214 in the example VR environment 210 may be formed by the window forming portion 130 through the identification of the location and extents of an interaction area in which the physical input devices are to be operated, such as the interaction area 258 illustrated in FIG. 2. The identification of the interaction area 258 may be achieved in a variety of manners. For example, in one example, the headset 150 of the example system 100 of FIG. 1 may be provided with controllers that are trackable in the physical environment by the headset 150 or the system 100. In some examples, the controllers (illustrated as markers 260a-d in FIG. 2) may be positioned to demarcate the interaction area 258 during a calibration process. In other examples, the controllers may remain in the illustrated positions to demarcate the interaction area 258 in real time. Upon identification of the interaction area 258, the window forming portion 130 may position the window 214 in a corresponding location in the VR environment 210, for example.

With the window 214 formed and appropriately positioned in the virtual environment 210, the input device display portion 140 may composite in the image of the at least one physical device. In this regard, a camera may capture an image of the interaction area 258 which contains at least one physical input device, such as the keyboard 254 or the mouse 256. The image captured by the camera can be composited with the virtual reality environment and displayed to the user on the head-mounted display 160.

Figure 3:
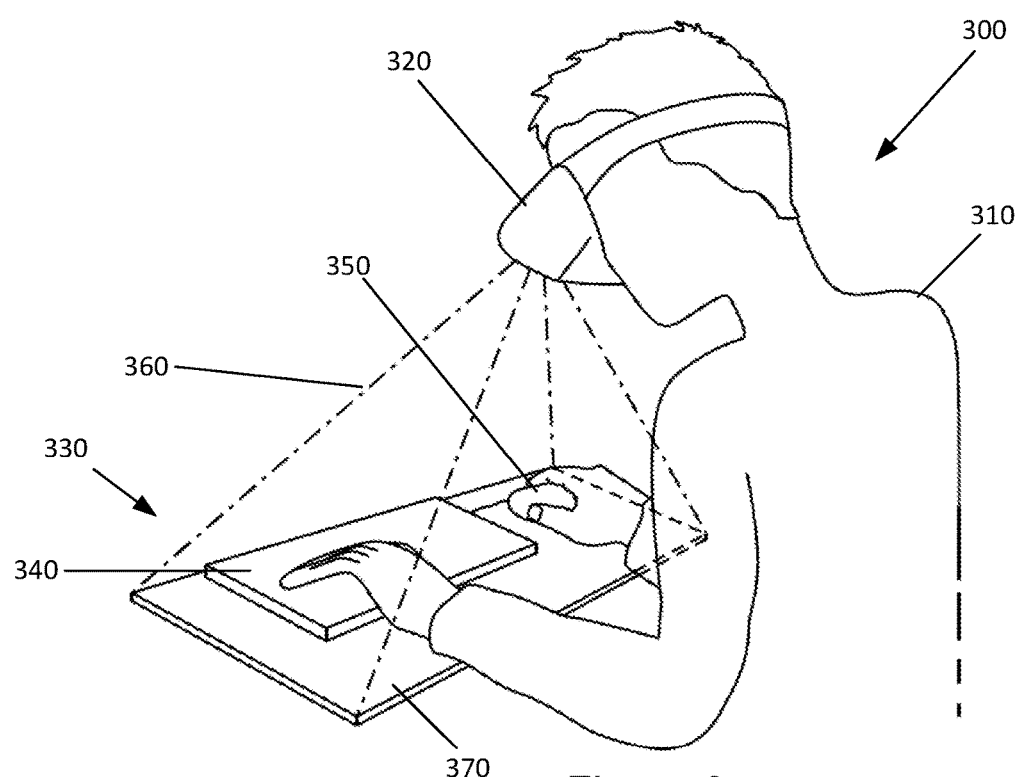
FIG. 3 illustrates an example arrangement with a camera mounted in an example VR headset.

As noted above with reference to FIG. 1, in some examples, the camera 110 may be provided within the headset 150. FIG. 3 illustrates one such example. Referring now to FIG. 3, an example arrangement 300 with a camera mounted in an example VR headset. In the example of FIG. 3, the example arrangement 300 includes a user 310 wearing a VR headset 320. The user 310 is shown working at a work station 330 which may include at least one physical input device, such as a keyboard 340 and a mouse 350. The example VR headset 320 of FIG. 3 includes a camera with at least a portion 360 of its field of view encompassing the interaction area 370. With the camera physically included in the headset 320, the camera may already be calibrated such that objects in the camera image, when displayed to the user via the head mounted display, appear at locations that correspond to their positions in the real world. Thus the location of the image captured by the camera of the interaction area 370 corresponds to the interaction area's physical location and extents, which in turn corresponds to the window formed in the virtual reality environment by the window forming portion 130 of FIG. 1. The VR headset 320, or a portion thereof (e.g., the input device display portion 140 of FIG. 1) may use the boundary of this window to clip the camera image down to the portion 360, corresponding to the interaction area 370, and combine the clipped camera image within the window of the virtual reality environment.

Figure 4:
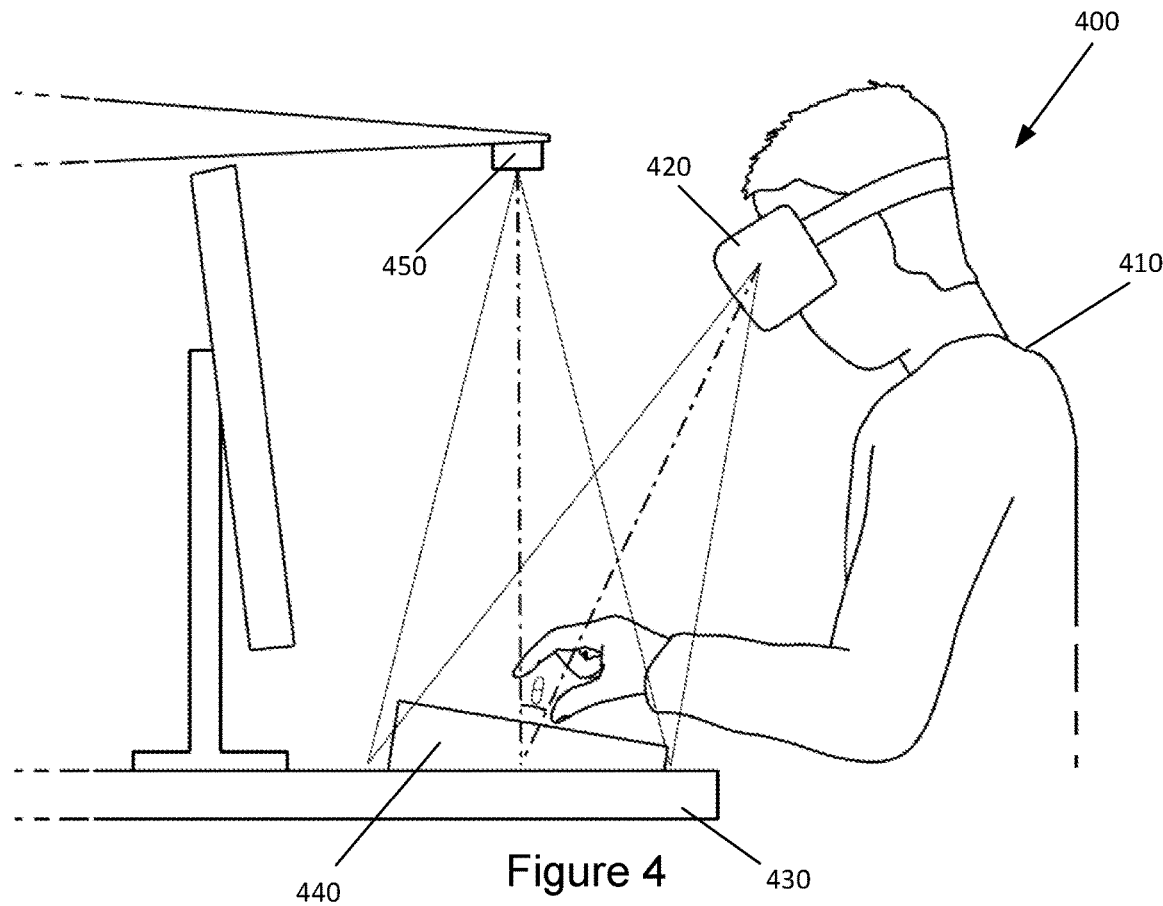
FIG. 4 illustrates another example arrangement with a camera mounted relative to an input device.

In other examples, the camera 110 of the system 100 of FIG. 1 may be physically separate from the headset 150. FIG. 4 illustrates one such example. Referring now to FIG. 4, another example arrangement 400 with a camera mounted relative to an interaction area is illustrated. Similar to the example arrangement 300 of FIG. 3, the example arrangement 400 of FIG. 4 includes a user 410 wearing a VR headset 420. The user 410 is shown working at a work station 430 which may include at least one physical input device, such as a keyboard 440, positioned in the interaction area. The example arrangement 400 includes a camera 450 mounted above the work station 430. In various examples, the camera 450 may be mounted on an arm affixed to the work station or another component. In this regard, the position of the camera 450 is fixed relative to an interaction area, and the physical input device (e.g., the keyboard 440) may be moved around within the interaction area.

With the camera 450 separated from the headset 420, the lack of alignment between their respective images means that the interaction area window used for the virtual reality environment cannot be used to define the interaction area in the camera image. For example, in the example of FIG. 4, the camera 450 captures an image of the keyboard 440 from an overhead position, while the VR headset is positioned at an angle θ from the overhead position. In this case the method used to identify the interaction area to the window forming portion 130 of FIG. 1 is extended to similarly define the area to the input device display portion 140. This is done, for example, by recognizing in the camera image the controller locations used to outline the interaction area (through shape recognition, or blinking lights or added machine-readable glyphs on the controllers). The camera is fixed with respect to the interaction area, so the portion of the camera image identified as corresponding to the interaction area remains fixed. The input device display portion 140 then maps this portion of the camera image to the current view of the interaction area in the virtual reality environment. In various examples, this may be done by transforming (e.g. stretching and skewing) the portion of the camera image to fit within the outline of the virtual reality view of the interaction area. For example, without transforming the camera image, the difference in the position of the camera 450 and the VR headset 420 may result in an unnatural or distorted view of the physical input device when displayed in the window of the virtual reality environment. The VR headset 420 may compensate for the difference in view angles by, for example, stretching the image of the keyboard 440 in the window of the virtual reality environment in a manner that corresponds to the angle θ.

In accordance with various examples described herein, the image of the physical input device captured by an image capture device (e.g., camera) is combined with the virtual reality environment in the VR headset. For example, as described above with reference to FIG. 1, the input device display portion 140 may be provided within the headset 150. By providing this functionality within the VR headset, latency between actions taken by the user vis-à-vis the physical input device and display of those actions, as captured by the camera, on the display of the headset can be significantly reduced.

Figure 5:
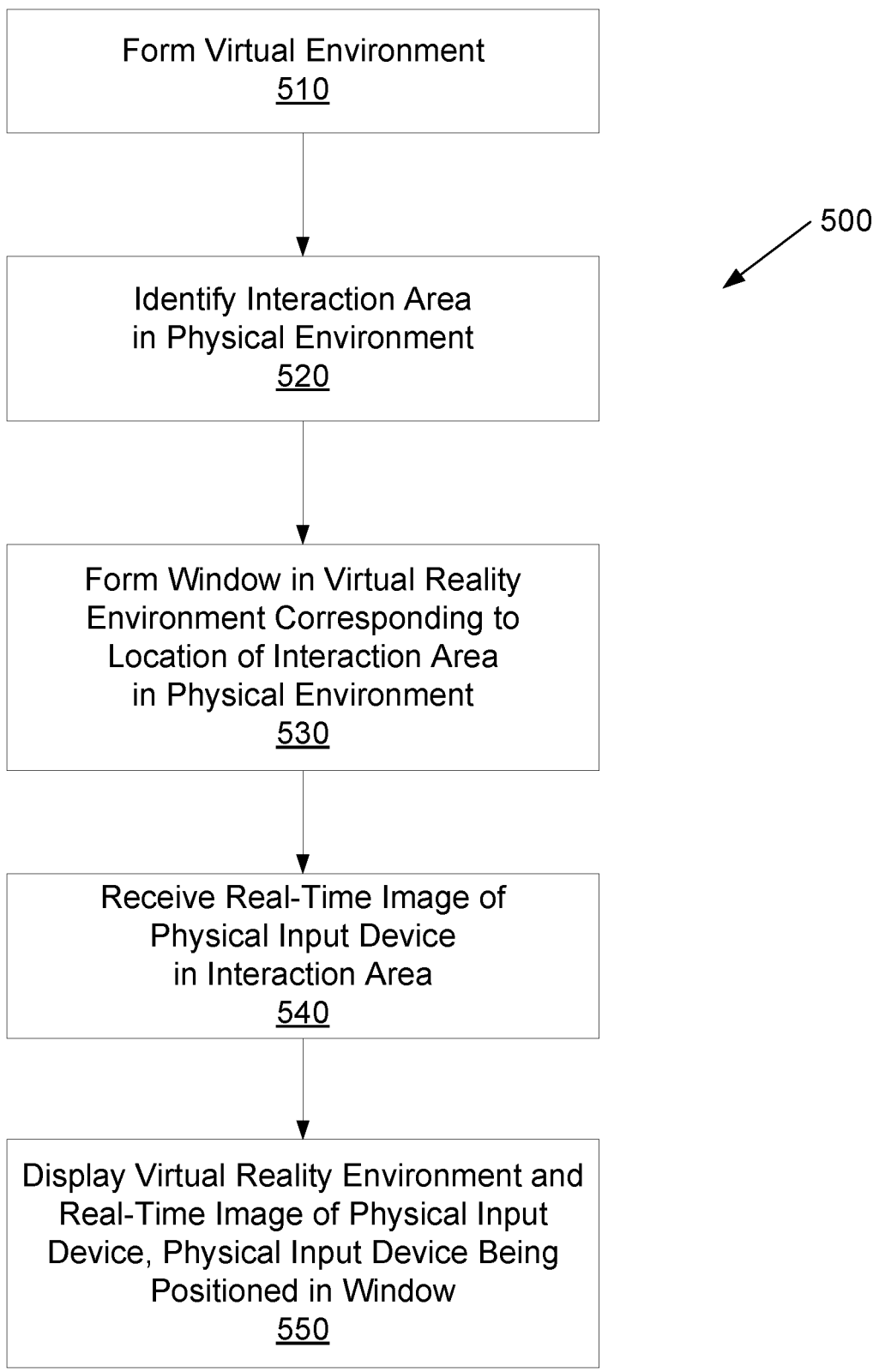
FIG. 5 is a flow chart illustrating an example method for VR environment display.

Referring now to FIG. 5, a flow chart illustrates an example method for VR environment display. The example method 500 of FIG. 5 includes forming a virtual reality environment (block 510). As noted above, the forming of the VR environment may be performed by a processor in the VR headset or in another processor separate from the VR headset. In the example of FIG. 1 above, the VR environment may be formed for display by the VR environment display portion 120 of the example system 100.

The example method 500 further includes identifying an interaction area in the physical environment (block 520). As noted above, the interaction area may be identified through the use of markers or controllers that are trackable or identifiable by the VR headset, for example.

The example method 500 of FIG. 5 further includes forming a window in the VR environment (block 530). In various examples, the location of the window in the VR environment corresponds to the location of the interaction area in the physical environment. As illustrated in the example of FIG. 2, the window 214 may be a transparent region created in the VR environment.

The example method 500 further includes receiving a real-time image of the at least one physical input device in the interaction area from an image capturing device (block 540). In this regard, a camera may provide a real-time (e.g., substantially continuously refreshed) image of the interaction area. At least one physical input device (e.g., keyboard, mouse, track ball, digitizing pen tablet, touch screen or the like) may be provided within the interaction area and may be included in the captured image. The real-time image may be received from the camera by a processor in the VR headset. The example method includes displaying the VR environment and the real-time image of the physical input device (block 550). As noted above, the physical input device is displayed within the window formed in the VR environment. The VR environment and the real-time image in the window may be displayed on a display of the VR headset, such as the head-mounted display 160 of the example system 100 of FIG. 1.

Figure 6:
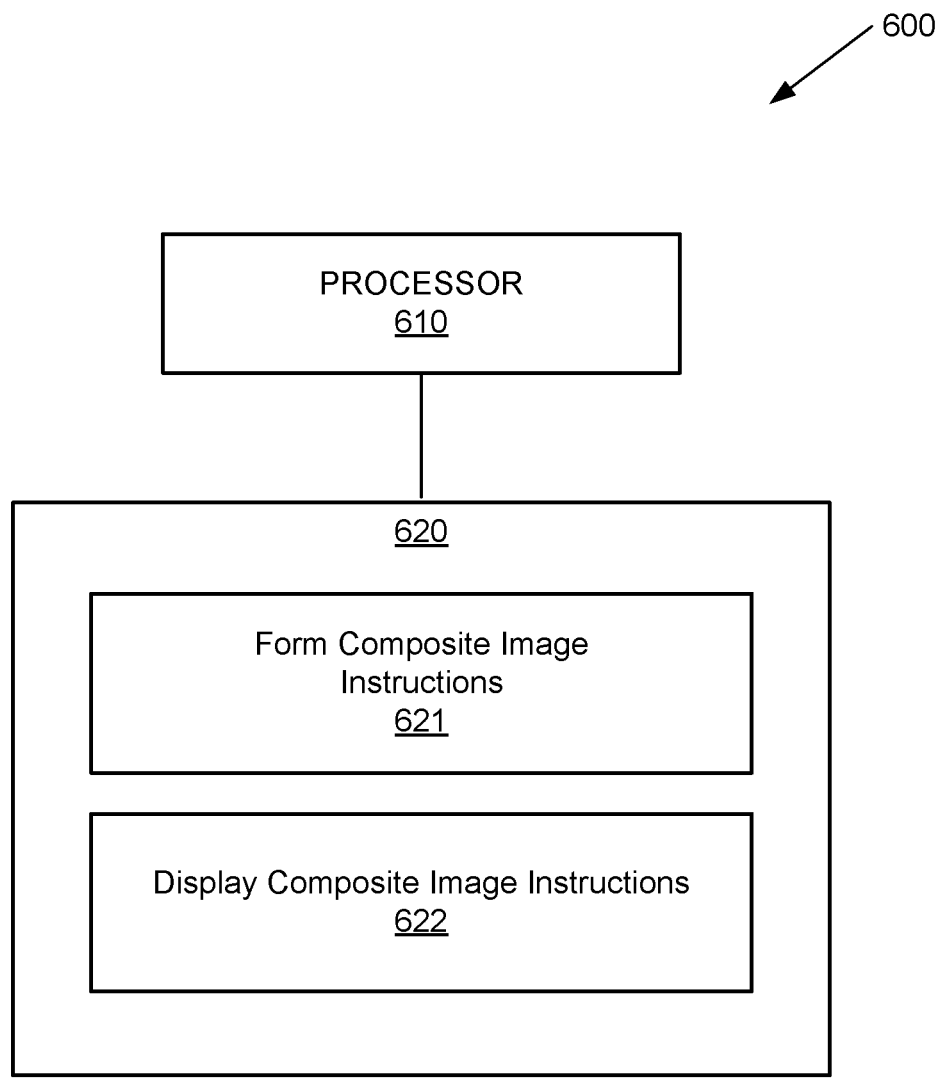
FIG. 6 illustrates a block diagram of an example system with a computer-readable storage medium including instructions executable by a processor for virtual reality display.

Referring now to FIG. 6, a block diagram of an example system is illustrated with a non-transitory computer-readable system including instructions executable by a processor for virtual reality display. The system 600 includes a processor 610 and a non-transitory computer-readable storage medium 620. The computer-readable storage medium 620 includes example instructions 621-622 executable by the processor 610 to perform various functionalities described herein. In various examples, the non-transitory computer-readable storage medium 620 may be any of a variety of storage devices including, but not limited to, a random access memory (RAM) a dynamic RAM (DRAM), static RAM (SRAM), flash memory, read-only memory (ROM), programmable ROM (PROM), electrically erasable PROM (EEPROM), or the like. In various examples, the processor 610 may be a general purpose processor, special purpose logic, or the like.

The example instructions include form composite image instructions 621. In various examples, a composite image may be generated using a VR environment, a window and a real-time image of at least one physical input device. As noted above, the location of the window in the VR environment corresponds to the physical location of an interaction area which includes the at least one physical input device. As noted above, the physical location of the interaction area may be determined by, for example, using markers to define a region or using shape recognition to identify the physical input device.

The example instructions further include displaying composite image instructions 622. As noted above, a real-time image of the physical input device may be received from a camera couple to the VR headset and may be displayed in the window in the VR environment.

Thus, in various examples, a user may view a physical input device while viewing a VR environment. The physical input device is viewed by the user within a window formed in the VR environment. Further, by using the processor in the headset, display latency can be significantly reduced.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
   a camera to capture an image of at least one physical input device; and
   a virtual reality (VR) environment display portion to generate a VR environment;
   a window forming portion to create a window in the VR environment, the position of the window in the VR environment corresponding to a physical location of an interaction area that includes the at least one physical input device;

an input device display portion to form an image of the at least one physical input device from the camera; and a VR headset including a head-mounted display to display a composite image of the VR environment, the window and the image of the at least one physical input device, wherein the composite image includes the image of the at least one physical input device within the window, wherein the camera is physically separate from the VR headset, and wherein the physical location of the interaction area is determined using a tracked position of controllers coupled to the VR headset.

2. The system of claim 1, wherein the at least one physical input device includes at least one of a keyboard, mouse, track-ball, digitizing pen tablet or touch-screen.

3. The system of claim 1, wherein the camera is mounted in a fixed position relative to the interaction area.

4. The system of claim 1, wherein at least one of the VR environment display portion, the window forming portion or the input device display portion is provided within the VR headset including the head-mounted display.

5. The system of claim 1, wherein the camera provides a real-time image of the at least one physical input device to display within the window.

6. A method, comprising forming, by a processor in a virtual-reality (VR) headset, a VR environment;

determining a physical location of an interaction area that includes at least one physical input device using a tracked position of controllers coupled to the VR headset;

forming a window in the VR environment, a location of the window in the VR environment corresponding to the physical location of the at least one physical input device;

receiving a real-time image of the at least one physical input device from an image capture device, wherein the image capture device is physically separate from the VR headset; and displaying the VR environment and the real-time image of the at least one physical device on a head-mounted display, wherein the real-time image of the at least one physical device is positioned in the window.

7. The method of claim 6, wherein the at least one physical input device includes at least one of a keyboard, mouse, track-ball, digitizing pen tablet or touch-screen.

8. The method of claim 6, wherein the image capture device is mounted in a fixed position relative to the interaction area.

9. A non-transitory computer-readable storage medium encoded with instructions executable by a processor of a computing system, the computer-readable storage medium comprising instructions to;

forming a composite image, the composite image including a virtual reality (VR) environment, a window and a real-time image of at least one physical device captured by an image capture device, wherein a location of the window in the VR environment corresponds to a physical location of an interaction area including the at least one physical input device; and displaying the composite image on a head-mounted display, wherein the real-time image of the at least one physical device is positioned in the window, wherein the processor is positioned in a virtual reality (VR) headset including the head-mounted display, wherein the camera is physically separate from the VR headset, and wherein the physical location of the interaction area is determined using a tracked position of controllers coupled to the VR headset.

10. The non-transitory computer-readable storage medium of claim 9, wherein the at least one physical input device includes at least one of a keyboard, mouse, track-ball, digitizing pen tablet or touch-screen.

11. The non-transitory computer-readable storage medium of claim 9, wherein the real-time image is received from the image capture device mounted in a fixed position relative to the interaction area.

\* \* \* \* \*